(12) United States Patent
Herrmann

(10) Patent No.: US 9,987,989 B2
(45) Date of Patent: Jun. 5, 2018

(54) ADJUSTABLE REARVIEW DEVICE, METHOD AND MOTOR VEHICLE

(71) Applicant: SMR Patents S.à.r.l., Luxembourg (LU)

(72) Inventor: Andreas Herrmann, Winnenden-Baach (DE)

(73) Assignee: SMR Patents S.A.R.L., Luxembourg (LU)

( * ) Notice: Subject to any disclaimer, the term of this patent is extended or adjusted under 35 U.S.C. 154(b) by 203 days.

(21) Appl. No.: 15/152,054

(22) Filed: May 11, 2016

(65) Prior Publication Data
US 2016/0332577 A1 Nov. 17, 2016

(30) Foreign Application Priority Data

May 12, 2015 (EP) .................................... 15167444

(51) Int. Cl.
| | |
|---|---|
| *B60R 1/074* | (2006.01) |
| *B60R 1/076* | (2006.01) |
| *B60R 1/12* | (2006.01) |
| *B60R 16/02* | (2006.01) |
| *B29C 45/14* | (2006.01) |
| *B29K 21/00* | (2006.01) |
| *B29L 11/00* | (2006.01) |
| *B29L 31/30* | (2006.01) |

(52) U.S. Cl.
CPC .............. *B60R 1/074* (2013.01); *B60R 1/076* (2013.01); *B60R 1/1207* (2013.01);
(Continued)

(58) Field of Classification Search
CPC ....... B60R 1/074; B60R 1/076; B60R 1/1207; B60R 16/0125
(Continued)

(56) References Cited

U.S. PATENT DOCUMENTS

| | | | |
|---|---|---|---|
| 4,523,735 A | 6/1985 | Beck et al. | |
| 5,005,797 A * | 4/1991 | Maekawa | ............... B60R 1/076 248/289.11 |

(Continued)

FOREIGN PATENT DOCUMENTS

| | | |
|---|---|---|
| GB | 1346945 | 2/1974 |
| WO | 2007031069 A2 | 3/2007 |

OTHER PUBLICATIONS

European Search Report, Application EP 15167444, dated Nov. 11, 2015.

*Primary Examiner* — Ricky D Shafer
(74) *Attorney, Agent, or Firm* — MacMillan, Sobanski & Todd, LLC

(57) ABSTRACT

An adjustable rearview device, especially a side-view mirror for a motor vehicle, has a mirror head, a mirror base and at least one joint device. The joint device is arranged between the mirror head and mirror base and includes at least one elastomeric element and an axis of rotation around which the mirror head can move. The mirror head is configured to move, particularly by rotating or folding relative to the mirror base, from a first functional position to at least one second functional position. In the first functional position, the elastomeric element holds the mirror head. In at least one second functional position, the elastomeric element is stretched or compressed. The adjustable rearview device has at least one electrical conductor, which extends at least between the mirror base and mirror head. The electrical conductor is elastically deformable at least in the direction of its longitudinal dimension.

17 Claims, 3 Drawing Sheets

(52) U.S. Cl.
CPC .... *B60R 16/0215* (2013.01); *B29C 45/14639* (2013.01); *B29K 2021/003* (2013.01); *B29L 2011/0058* (2013.01); *B29L 2031/3005* (2013.01)

(58) Field of Classification Search
USPC .................................................. 359/841, 877
See application file for complete search history.

(56) References Cited

U.S. PATENT DOCUMENTS

| | | | | |
|---|---|---|---|---|
| 5,166,832 | A * | 11/1992 | Zychowicz | B60R 1/074 248/479 |
| 5,579,178 | A * | 11/1996 | Mochizuki | B60R 1/074 359/841 |
| 5,864,438 | A * | 1/1999 | Pace | B60R 1/078 359/841 |
| 5,889,624 | A * | 3/1999 | Dickenson | B60R 1/07 248/479 |
| 7,207,684 | B2 * | 4/2007 | Huprikar | B60R 1/076 248/479 |
| 2005/0219722 | A1 * | 10/2005 | Watrous | B60R 1/0617 359/841 |
| 2008/0204912 | A1 * | 8/2008 | Ekenhorst | B60R 1/0617 359/842 |
| 2011/0222176 | A1 * | 9/2011 | Browne | B60R 1/072 359/846 |
| 2014/0098437 | A1 * | 4/2014 | Herrmann | B60R 1/072 359/877 |

* cited by examiner

ADJUSTABLE REARVIEW DEVICE, METHOD AND MOTOR VEHICLE

CROSS-REFERENCE TO RELATED APPLICATIONS

This application claims priority from European Patent Application No. 15167444.7, filed May 12, 2015, the disclosure of which is incorporated herein by reference.

BACKGROUND OF THE INVENTION

The invention relates to an adjustable rearview device, especially a side-view mirror, for a motor vehicle having a mirror head, a mirror base and at least one joint device. The at least one joint device is arranged between the mirror head and mirror base and comprises at least one elastomeric element. The at least one joint device further includes an axis of rotation around which the mirror head can move, particularly rotate or fold relative to the mirror base. The mirror head can move from a first functional position, in which the elastomeric element holds the mirror head, into at least one second functional position, in which the elastomeric element is stretched or compressed. The adjustable rearview device further has at least one electrical conducting means, which extends at least between the mirror base and mirror head and through which electrical energy can be transported. The invention furthermore relates to a method for manufacturing such a rearview device and to a motor vehicle having such a rearview device.

Adjustable rearview devices are well known, for example in the form of side-view mirrors for motor vehicles. In these, a mirror head can be adjusted relative to a mirror base, which is fastened to the motor vehicle, by rotation. In the known rearview devices, the adjustment can comprise folding the side-view mirror outwards or down for example when the motor vehicle is parked. To this end, a joint device, which can comprise of an elastomeric element, for example, is arranged between the mirror head and mirror base. Such a joint device is known from WO2007/031069 A2.

Electrical consumers, such as turn signal repeaters, blind spot displays and the like, which must be connected to a current source in the motor vehicle via electrical conducting means, are arranged within the known rearview devices. In the area of the joint device, the electrical conducting means must be provided with enough play so that they can non-destructively follow the movements of the mirror head relative to the mirror base. Moreover, the conducting means must be fastened adequately immobilized to prevent unintentional damage.

The assembly of such a conducting means and the design of the respective areas of the joint devices have proven to be space-consuming, cumbersome and time-consuming.

SUMMARY OF THE INVENTION

The invention relates to an adjustable rearview device, especially a side-view mirror, for a motor vehicle having a mirror head, a mirror base and at least one joint device. The at least one joint device is arranged between the mirror head and mirror base and comprises at least one elastomeric element. The at least one joint device further includes an axis of rotation around which the mirror head can move, particularly rotate or fold relative to the mirror base. The mirror head can move from a first functional position, in which the elastomeric element holds the mirror head, into at least one second functional position, in which the elastomeric element is stretched or compressed. The adjustable rearview device further has at least one electrical conducting means, which extends at least between the mirror base and mirror head and through which electrical energy can be transported. The invention furthermore relates to a method for manufacturing such a rearview device and to a motor vehicle having such a rearview device.

The adjustable rearview device stated in the introduction achieves improved product performance, packaging and manufacturing in that the at least one electrical conducting means is elastically deformable at least in the direction of its longitudinal dimension.

Since the at least one electrical conducting means is elastically deformable in the direction of its longitudinal dimension, the at least one conducting means can be routed close to the elastomeric element without the relative movement of the mirror head and mirror base thereby causing damage to the electrical conducting means. This enables the joint device to be configured compactly and simplifies the assembly of the rearview device.

The electrical conducting means can basically be configured as desired provided that it satisfies the function of being elastically deformable at least in regard to its longitudinal dimension and without simultaneously losing its current-carrying properties. It proves advantageous for the at least one electrical conducting means to comprise at least one carbon nanotube or a plurality of carbon nanotubes.

To reduce the power loss within the electrical conducting means, especially to reduce the danger of leakage currents, it proves advantageous for the rearview device to comprise at least one insulating means, particularly an electrically insulating insulating means, for the at least one electrical conducting means.

In a further development of the latter embodiment, the insulating means is easily and inexpensively realized if the at least one carbon nanotube comprises at least one unoxidized, internal current-conducting layer and at least one oxidized, external insulating layer, which in particular comprises the insulating means and/or almost completely surrounds the at least one carbon nanotube externally.

To increase the insulating effect further, an additional insulating element, which forms another insulating layer for the electrical conducting means, can be provided in a further development of the latter embodiment.

It is basically conceivable that the at least one electrical conducting means be arranged to extend outside the elastomeric element in the area of the joint device. It proves advantageous however for the at least one electrical conducting means to be arranged to extend at least predominantly inside the elastomeric element in the area of the joint device.

Since the electrical conducting means is arranged to extend inside the elastomeric element at least in the area of the joint device, the joint device forms a preassembled subassembly thereby simplifying the assembly of the rearview device. Moreover, damage to the conducting means is further reduced if it is arranged to extend inside the elastomeric element.

It is basically conceivable that the electrical energy transported through the electrical conducting means is sufficient to supply all electrical consumers arranged within the mirror head with energy. To nevertheless have sufficient energy available at power peaks or when the supply of electrical energy fails on the vehicle-side for example, it proves advantageous to provide the rearview device with at least one energy store, which in particular can comprise a nanotube capacitor, arranged in the mirror head. This enables the energy store to equalize power peaks which the specific conductance cannot adequately manage for the sake of the electrical conducting means. If the power supply of the motor vehicle fails, the energy store can further operate the emergency warning indicators at least for a certain time.

In another embodiment example, the rearview device comprises at least two electrical conducting means, wherein a first electrical conducting means can be or is indirectly or directly connected to an electrical consumer, such as an illuminant, especially an LED, or electric motor, and/or wherein at least one second electrical conducting means can be or is directly or indirectly connected to the at least one energy store. This further increases the redundancy of the energy supply inside the rearview device. If at least two electrical conducting means are provided, at least one of the at least two electrical conducting means can be arranged to extend inside the elastomeric element and the second electrical conducting means can be arranged to extend outside the elastomeric element. It is also furthermore conceivable that both or a plurality of electrical conducting means are arranged to extend inside the elastomeric element.

In order to be able to efficiently distribute the amount of energy transportable through the electrical conducting means, at least one control unit having at least one control logic stored in the control unit is provided in one embodiment example of the rearview device to prioritize the distribution of electrical energy to a plurality of electrical consumers through the at least one electrical conducting means and/or through the at least one energy store.

Moreover, it proves advantageous for the elastomeric element to be molded onto the mirror head and/or onto the mirror base and/or for the elastomeric element and the at least one electrical conducting means to be integrated into the mirror head or mirror base by means of a multicomponent injection molding process.

To establish a connection to a current source of the motor vehicle in a simple manner, it proves advantageous for the rearview device to comprise at least one contact means of the electrical conducting means, wherein the contact means can be arranged on the end of the conducting means facing the motor vehicle and establish a connection to a current source of the motor vehicle.

The object is furthermore achieved by a method for manufacturing a rearview device, especially one having at least one of the abovementioned features, having a mirror base, a mirror head, at least one elastomeric element and at least one electrical conducting means, having the steps: placing or inserting the mirror base into an injection mold; placing or inserting the mirror head into the injection mold; inserting the at least one electrical conducting means; and injecting the multicomponent elastomeric element. In such a case, the electrical conducting means is arranged to extend inside the elastomeric element.

Here it is particularly advantageous that inside the mold, the joint device and the energy supply can be produced in terms of the electrical conducting means, thereby rendering the production process more efficient and simplifying and facilitating an assembly of the joint device in the rearview device.

In a further development of the method, it proves advantageous for the injection of the multicomponent elastomeric element to comprise a molding of the elastomeric element onto the mirror base and/or onto the mirror head.

Finally, the production method of the manufacturing process of the adjustable rearview mirror can be rendered even more efficient if it comprises the additional method step of coating the at least one electrical conducting means with an additional insulating element.

Here it proves advantageous for the coating of the at least one electrical conducting means with an additional insulating element to take place before the step of injecting the multicomponent elastomeric element into the injection mold.

Finally, the object is achieved by a motor vehicle having at least one rearview device, especially one having at least one of the aforementioned features.

The adjustable rearview device, the method for manufacturing such a rearview device and the motor vehicle having such a rearview device prove advantageous in multiple respects:

Since the at least one electrical conducting means is elastically deformable in relation to its longitudinal dimension, the joint device can be configured compactly.

Since the at least one electrical conducting means can be arranged to extend inside the elastomeric element, the joint device can be configured compactly and the danger of damaging the at least one electrical conducting means is further reduced.

Additional features, details and advantages emerge from the enclosed patent claims, the graphic illustration and the following description of preferred embodiments of the adjustable rearview device.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
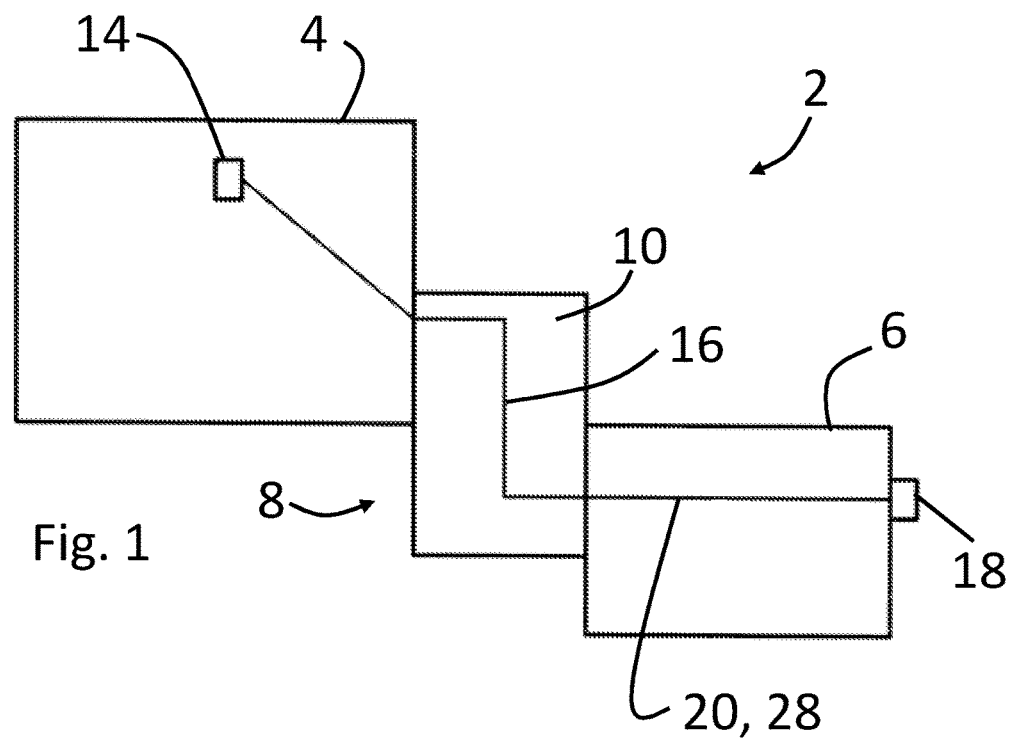
FIG. 1 is a schematic representation of a first embodiment example of the rearview device.

Referring now to the drawings, there is illustrated in FIG. 1 a first embodiment example of a rearview device for a motor vehicle provided with the reference character 2 taken as a whole. The rearview device 2 comprises a mirror head 4 and a mirror base 6. A joint device 8, which comprises an elastomeric element 10 and an axis of rotation 12 (not illustrated in FIGS. 1 and 2), is arranged between the mirror head 4 and the mirror base 6. The joint device 8 enables the mirror head 4 to rotate or fold in relation to the mirror base 6. To supply electrical consumers 14 arranged in the mirror head 4 with electrical energy, the rearview device 2 comprises an electrical conducting means 16, which extends between mirror base 6 and mirror head 4 and through which electrical energy can be transported. The electrical conducting means 16 illustrated in FIGS. 1 to 4 is elastically deformable in the direction of its longitudinal dimension.

Moreover, the rearview device 2 comprises a contact means 18, which can connect the end of the electrical conducting means 16 facing the motor vehicle to a current source of the motor vehicle. The electrical conducting means depicted in FIGS. 1 to 4 comprises at least one carbon nanotube. Moreover, an electrically insulating insulating means 20, which is formed for example by an oxidized external insulating layer of the carbon nanotube, surrounds the electrical conducting means 18. This oxidized external layer entirely surrounds the electrical conducting means 16 formed as carbon nanotube.

Figure 2:
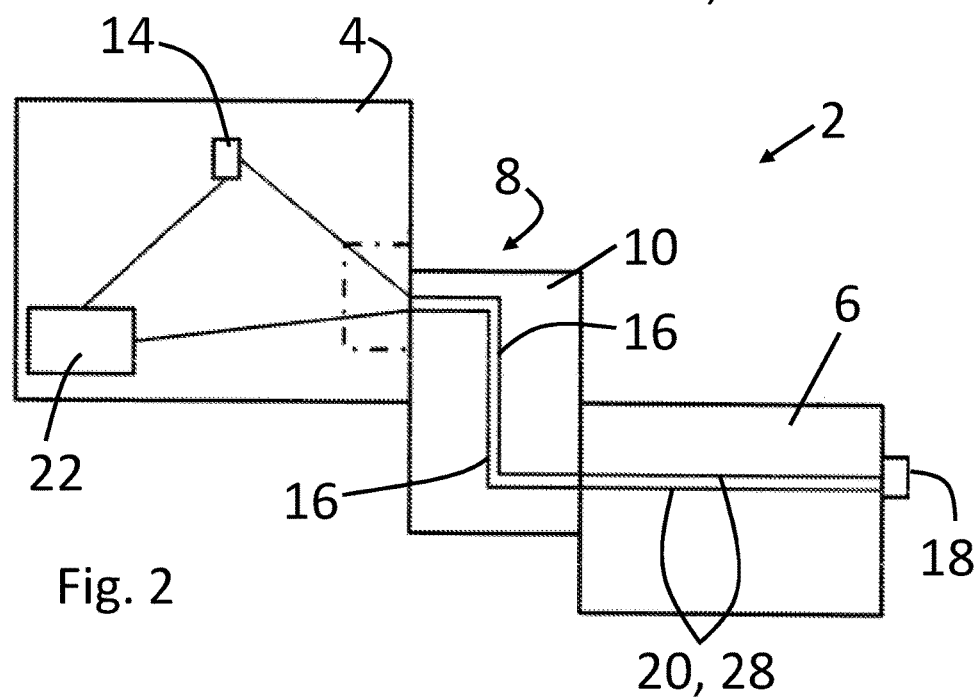
FIG. 2 is a schematic representation of a second embodiment example of the rearview device.

FIG. 2 depicts a second embodiment example of the rearview device 2, in which two electrical conducting means 16 are provided. Here a first electrical conducting means 16 is directly connected to an electrical consumer 14, wherein a second electrical conducting means 16 is connected to an energy store 22 to supply the electrical consumer with electrical energy on the part of the current source of the motor vehicle. The energy store 22 for its part is again connected to the electrical consumer 14 and supplies it with electrical energy, if for example the energy transported through the electrical conducting means 16 is insufficient to supply the electrical consumer 14. Moreover, the embodiment example according to FIG. 2 comprises a control unit 24 which distributes the electrical energy standing available to the respective electrical consumers 14 by means of a control logic stored in the control unit 24.

Figure 3:
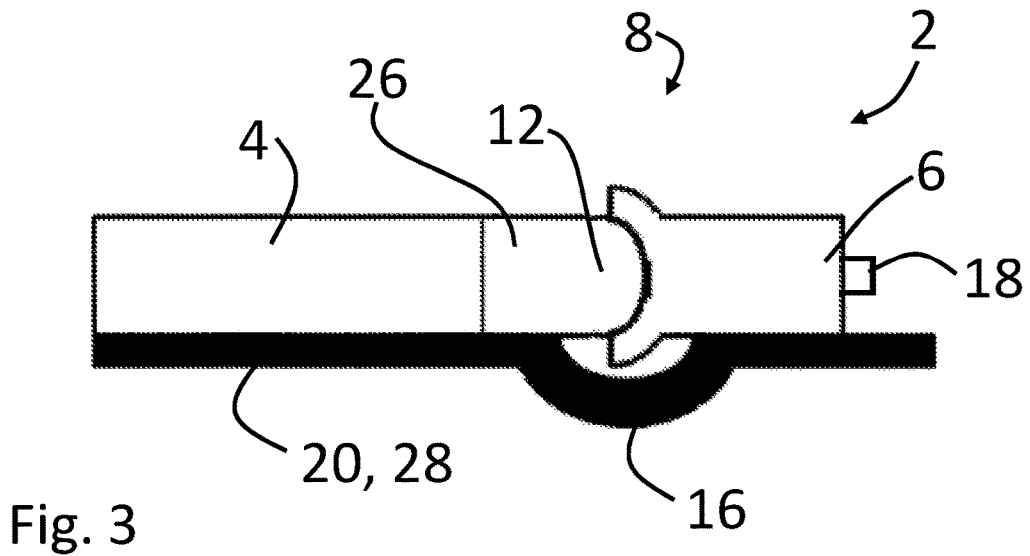
FIG. 3 is a schematic detailed view of a third embodiment example of the rearview device.
Figure 4:
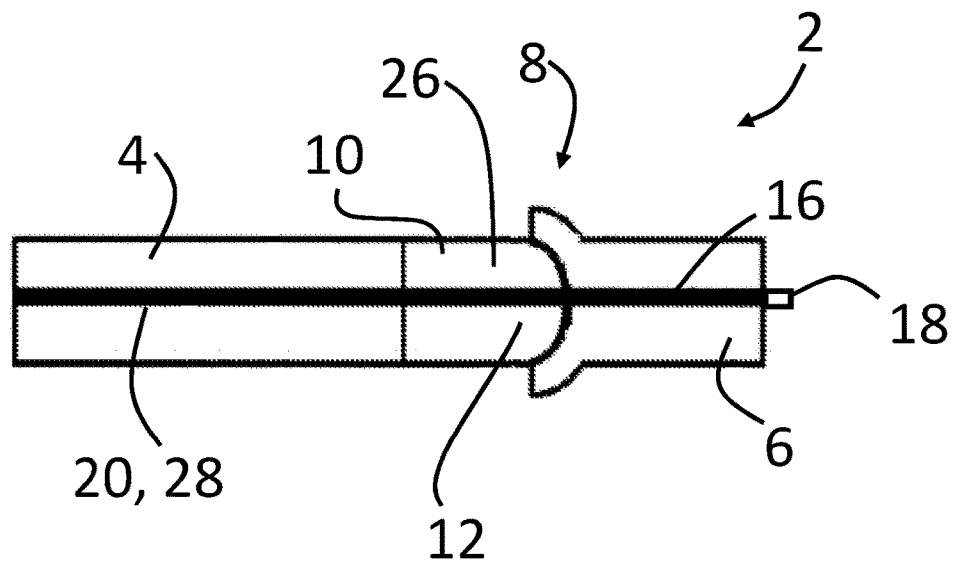
FIG. 4 is a schematic detailed view of a fourth embodiment example of the rearview device.

Other embodiment examples which can be combined with the embodiment examples of FIGS. 1 and 2 are visible in FIGS. 3 and 4. Thus FIG. 3 illustrates the area of the joint device 8 within which the electrical conducting means 16 is arranged to extend outside an elastomeric element 26 of the joint device 8.

FIG. 4 depicts a cutout of the joint device 8 in which the electrical conducting means 16 is arranged to extend inside the elastomeric element 26.

Figure 5:
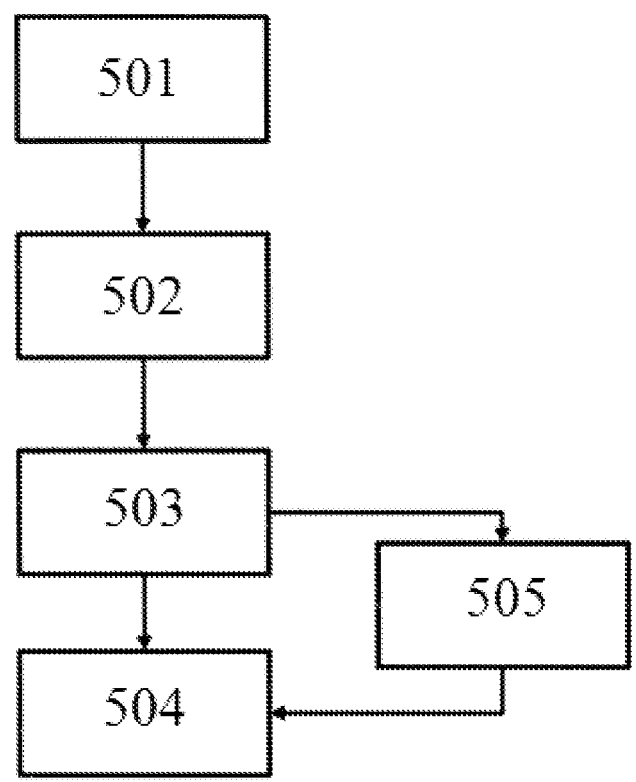
FIG. 5 is a schematic sequence diagram of the method for manufacturing a rearview device.

FIG. 5 depicts a schematic sequence diagram of a method for manufacturing a joint device of the rearview mirror device. Here the mirror base 6 of the rearview device 2 is inserted into an injection mold in a first step 501.

The mirror head 4 of the joint device 8 is inserted into the injection mold in a step 502. The at least one electrical conducting means 16 is inserted into the injection mold in a step 503. The elastomeric element is manufactured by injecting a multicomponent plastic in a step 504. The electrical conducting means can optionally be coated with an additional insulating element 28 in a step 505 before step 504.

Here the injection of the multicomponent elastomeric element 26 can comprise of molding the elastomeric element 26 to the mirror base 6 and/or mirror head 4.

Features of the invention indicated in the above description, in the claims and in the drawing can be essential to the realization of the invention and its various embodiments both individually as well as in any desired combination.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. An adjustable rearview device for a motor vehicle includes a mirror head, a mirror base and at least one joint device which is arranged between the mirror head and mirror base and comprises at least one elastomeric element and an axis of rotation around which the mirror head can rotate or fold relative to the mirror base, from a first functional position, in which the elastomeric element holds the mirror head, into at least one second functional position in which the elastomeric element is stretched or compressed, further having at least one electrical conductor, which extends at least between the mirror base and mirror head and through which electrical energy can be transported wherein the at least one electrical conductor is elastically deformable at least in a direction of its longitudinal dimension.

2. The adjustable rearview device according to claim 1, wherein the at least one electrical conductor comprises at least one of a carbon nanotube or a plurality of carbon nanotubes.

3. The adjustable rearview device according to claim 2, wherein the at least one carbon nanotube comprises at least one unoxidized, internal current-conducting layer and at least one oxidized, external insulating layer, which comprises at least one insulator which almost completely surrounds the at least one carbon nanotube externally.

4. The adjustable rearview device according to claim 1 wherein the at least one electrical conductor has at least one insulator configured as an electrically insulating insulator.

5. The adjustable rearview device according to claim 4, wherein the insulator has an additional insulating element, which forms another insulating layer for the electrical conductor.

6. The adjustable rearview device according to claim 1, wherein the at least one electrical conductor is arranged to extend at least predominantly inside the elastomeric element in an area of the joint device.

7. The adjustable rearview device according to claim 1, wherein at least one energy store is arranged in the mirror head.

8. The adjustable rearview device of claim 7 wherein the at least one energy store is a nanotube capacitor.

9. The adjustable rearview device according to claim 1, wherein the at least one electrical conductor is a plurality of electrical conductors, wherein a first electrical conductor is indirectly or directly connected to an electrical consumer and/or wherein at least one second electrical conductor is directly or indirectly connected to at least one energy store.

10. The adjustable rearview device of claim 9, wherein the electrical consumer is configured as at least one of an illuminant, an LED, and an electric motor.

11. The adjustable rearview device according to claim 1, including at least one control unit having at least one stored control logic stored to prioritize a distribution of electrical energy to a plurality of electrical consumers through the at least one electrical conductor and/or through the at least one energy store.

12. The adjustable rearview device according to claim 1, wherein the elastomeric element is molded onto the mirror head and/or onto the mirror base, and/or the elastomeric element and the at least one electrical conductor are integrated into one of the mirror head or mirror base by way of a multicomponent injection molding process.

13. The adjustable rearview device according to claim 1, wherein at least one contact of the electrical conductor is configured to be arranged on an end of the electrical conductor facing the motor vehicle and establish a connection to a current source of the motor vehicle.

14. A method for manufacturing a joint device of a rearview device according to claim 1, having the mirror base, the mirror head, the at least one elastomeric element and the at least one electrical conductor, comprising the steps of:
   a. placing or inserting the mirror base into an injection mold;
   b. placing or inserting the mirror head into the injection mold;
   c. inserting the at least one electrical conductor; and
   d. injecting a multicomponent elastomeric element.

15. The method according to claim 14, wherein the injection of the multicomponent elastomeric element comprises molding the elastomeric element onto at least one of the mirror base and/or the mirror head.

16. The method according to claim 14, including the step of:
   e. coating the at least one electrical conductor with an additional insulating element.

17. A motor vehicle having at least one rearview device according to claim 1.

* * * * *